United States Patent
Niinuma

(10) Patent No.: US 8,656,474 B2
(45) Date of Patent: Feb. 18, 2014

(54) BIOMETRIC AUTHENTICATION DEVICE, BIOMETRIC AUTHENTICATION METHOD AND STORAGE MEDIUM

(75) Inventor: Koichiro Niinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/240,429

(22) Filed: Sep. 22, 2011

(65) Prior Publication Data

US 2012/0011579 A1    Jan. 12, 2012

Related U.S. Application Data

(63) Continuation of application No. PCT/JP2009/056563, filed on Mar. 30, 2009.

(51) Int. Cl.
*G06F 21/00*    (2013.01)

(52) U.S. Cl.
USPC .............................................. 726/9; 713/182

(58) Field of Classification Search
None
See application file for complete search history.

(56) References Cited

U.S. PATENT DOCUMENTS

| | | | |
|---|---|---|---|
| 6,751,734 B1 * | 6/2004 | Uchida | 713/186 |
| 6,980,669 B1 | 12/2005 | Uchida | |
| 7,007,298 B1 | 2/2006 | Shinzaki et al. | |
| 8,255,698 B2 * | 8/2012 | Li et al. | 713/186 |
| 2008/0049984 A1 * | 2/2008 | Poo et al. | 382/115 |
| 2009/0164799 A1 * | 6/2009 | Takagi | 713/186 |

FOREIGN PATENT DOCUMENTS

| | | |
|---|---|---|
| JP | 9-297844 | 11/1997 |
| JP | 2000-259278 | 9/2000 |
| JP | 2000-276445 | 10/2000 |
| JP | 2001-167053 | 6/2001 |
| JP | 2001-307102 | 11/2001 |
| JP | 2006-107340 | 4/2006 |
| JP | 2006-251961 | 9/2006 |

OTHER PUBLICATIONS

International Search Report mailed on Jun. 2, 2009, in corresponding PCT Application No. PCT/JP2009/056563.
Japanese Office Action issued Jul. 16, 2013 in corresponding Japanese Application No. 2011-508113.

* cited by examiner

*Primary Examiner* — Fikremariam A Yalew
(74) *Attorney, Agent, or Firm* — Staas & Halsey LLP

(57) ABSTRACT

A biometric authentication device includes: a biometric information obtain portion obtaining biometric information of a user; a biometric condition determine portion determining good and bad of biometric condition of the user according to the biometric information of the user; a biometric matching portion performing a matching of registered biometric information registered in advance based on the biometric information; an alternate authentication portion performing an authentication based on information that is different from the biometric information; and an alternate authentication control portion switching validation and invalidation of the authentication by the alternate authentication portion according to a determination result of the biometric condition determine portion.

18 Claims, 14 Drawing Sheets

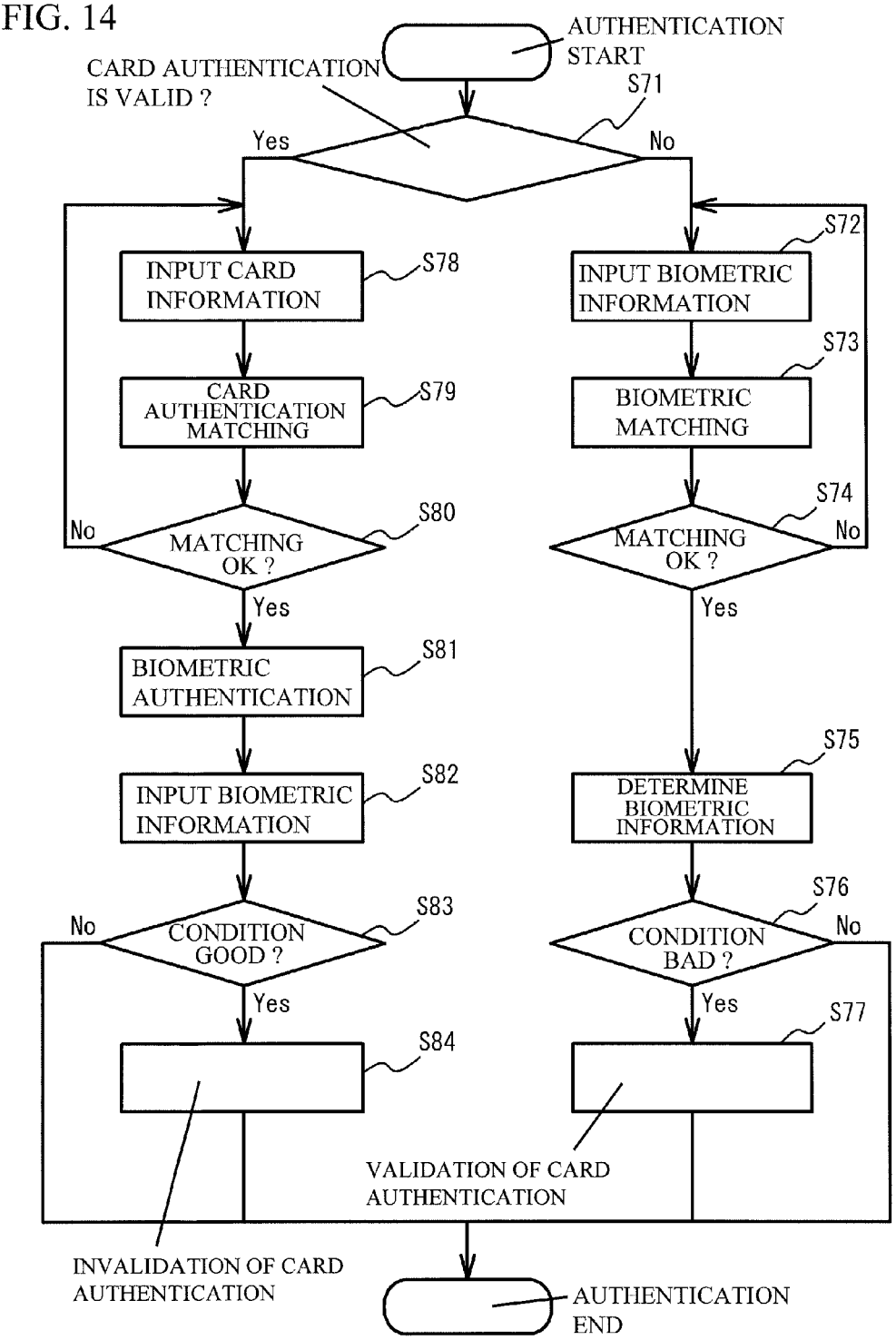

US 8,656,474 B2

BIOMETRIC AUTHENTICATION DEVICE, BIOMETRIC AUTHENTICATION METHOD AND STORAGE MEDIUM

CROSS-REFERENCE TO RELATED APPLICATION

This application is a continuation application of PCT/JP2009/056563 filed Mar. 30, 2009, the contents of which are herein wholly incorporated by reference.

FIELD

A certain aspect of the present invention is related to a biometric authentication device, a biometric authentication method, and a storage medium.

BACKGROUND

In a person authentication, a risk of plagiarism is relatively high with use of a password authentication, an ID card authentication or the like that are widely used conventionally. And so, a biometric authentication such as a fingerprint authentication attracts attention as a person authentication having higher reliability and is being used in many situations.

It is a problem of the biometric authentication that an authentication is difficult. In order to solve the problem, a method in which biometric authentication and an alternate authentication (for example a password authentication) are combined is disclosed (see Patent Documents 1 to 3). In the methods, the password authentication is performed when the biometric authentication is difficult.

Patent Document 1: Japanese Laid-Open Patent Publication No. 9-297844
Patent Document 2: Japanese Laid-Open Patent Publication No. 2006-107340
Patent Document 3: Japanese Laid-Open Patent Publication No. 2001-307102

SUMMARY

According to an aspect of the present invention, there is provided a biometric authentication device comprising: a biometric information obtain portion obtaining biometric information of a user; a biometric condition determine portion determining good and bad of biometric condition of the user according to the biometric information of the user; a biometric matching portion performing a matching of registered biometric information registered in advance based on the biometric information; an alternate authentication portion performing an authentication based on information that is different from the biometric information; and an alternate authentication control portion switching validation and invalidation of the authentication by the alternate authentication portion according to a determination result of the biometric condition determine portion.

According to another aspect of the present invention, there is provided a biometric authentication method comprising: obtaining biometric information of a user; determining good and bad of biometric condition of the user according to the biometric information of the user; performing a matching of registered biometric information registered in advance based on the biometric information; performing an alternate authentication based on information that is different from the biometric information; and switching validation and invalidation of the alternate authentication according to a determination result of the determining of the biometric condition.

According to another aspect of the present invention, there is provided a storage medium that is readable by a computer and stores a program causing a computer to act as: a biometric information obtain portion obtaining biometric information of a user; a biometric condition determine portion determining good and bad of biometric condition of the user according to the biometric information of the user; a biometric matching portion performing a matching of registered biometric information registered in advance based on the biometric information; an alternate authentication portion performing an authentication based on information that is different from the biometric information; and an alternate authentication control portion switching validation and invalidation of the authentication by the alternate authentication portion according to a determination result of the biometric condition determine portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 illustrates an example of a flowchart executed by the biometric authentication device in accordance with the embodiment 4.

DESCRIPTION OF EMBODIMENTS

In a conventional method in which a biometric authentication and an alternate authentication (for example a password authentication) are combined, there are problems of complication of issuing of a password to all users, security of issuing of a password to all users, or the like, when an auxiliary authentication key such as a password is issued to all users in advance.

There is a method in which a user or an administrator determines necessity of issuing of a password. For example, there is a method in which an administrator determines a condition of hand roughness; a password is activated only when the hand roughness gets worse and a fingerprint authentication becomes difficult; and the password is inactivated when the hand roughness returns to normal and the fingerprint authentication becomes possible. In this case, there is a problem of the complication that a user or an administrator determines the condition of the hand roughness and switches validation and invalidation of the password.

A description will be given of embodiments of the invention, with reference to drawings.

Embodiment 1

Figure 1:
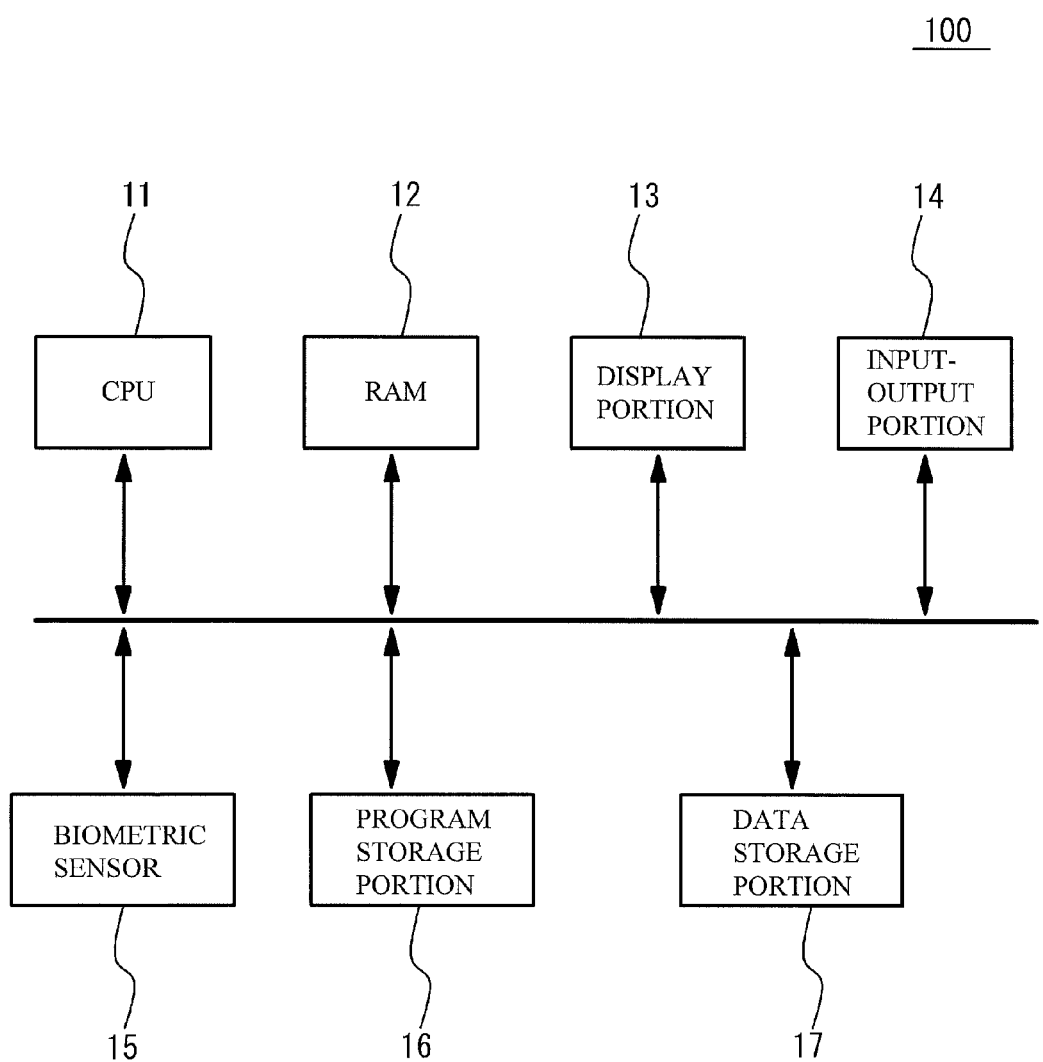
FIG. 1 illustrates a component structure of a biometric authentication device in accordance with an embodiment 1.
Figure 2:
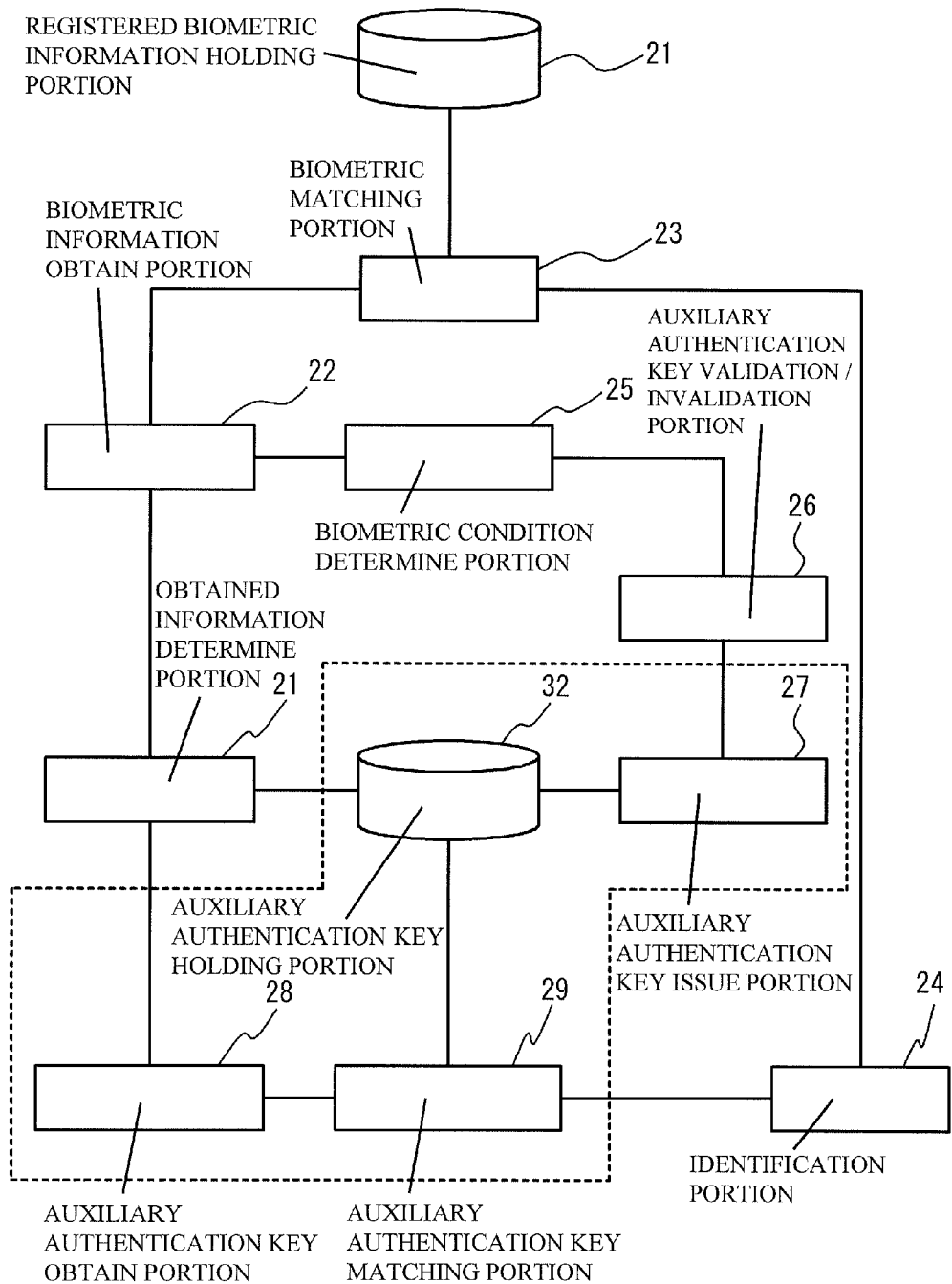
FIG. 2 illustrates a function block diagram of the biometric authentication device in accordance with the embodiment 1.

FIG. 1 illustrates a component structure of a biometric authentication device 100 in accordance with an embodiment 1. FIG. 2 illustrates a function block diagram of the biometric authentication device 100. A description will be given of the biometric authentication device 100 with reference to FIG. 1 and FIG. 2.

As illustrated in FIG. 1, the biometric authentication device 100 has a CPU (Central Processing Unit) 11, a RAM (Random Access Memory) 12, a display portion 13, an input-output portion 14, a biometric sensor 15, a program storage portion 16, a data storage portion 17, and so on. The components are coupled to each other via a bus or the like.

The biometric sensor 15 is a sensor for obtaining biometric information such as fingerprint information of a user or vein information of a user. In the embodiment, a fingerprint sensor is used as the biometric sensor 15. The program storage portion 16 and the data storage portion 17 are a ROM (Read Only Memory), a hard disk or the like.

An obtained information determine portion 21, a biometric information obtain portion 22, a biometric matching portion 23, an identification portion 24, a biometric condition determine portion 25, an auxiliary authentication key validation/invalidation portion 26, an auxiliary authentication key issue portion 27, an auxiliary authentication key obtain portion 28, and an auxiliary authentication key matching portion 29 operate when the CPU 11 executes each program stored in the program storage portion 16. The data storage portion 17 acts as a registered biometric information holding portion 31 and an auxiliary authentication key holding portion 32 of the figure. An operation of the components is described as follows.

The obtained information determine portion 21 determines whether an auxiliary authentication key is valid or invalid. If the obtained information determine portion 21 determines that the auxiliary authentication key is invalid, the biometric information obtain portion 22 obtains biometric information of a user from the biometric sensor 15. The registered biometric information holding portion 31 holds registered biometric information of each user.

The biometric matching portion 23 matches biometric information for matching of the user obtained by the biometric information obtain portion 22 and registered biometric information of the user held by the registered biometric information holding portion 31. The identification portion 24 determines that the matching result is success when a similarity between the biometric information for matching and the registered biometric information is a threshold value or more, and determines that the matching result is failure when the similarity between the biometric information for matching and the registered biometric information is less than the threshold value.

The biometric condition determine portion 25 determines good and bad of the biometric condition of a user based on the biometric information obtained by the biometric information obtain portion 22. A matching success rate, a similarity, biometric quality, a failure rate of image obtaining, a scan speed of a sweep type of a fingerprint sensor or the like may be used as a determination criteria of the biometric condition.

For example, the biometric condition determine portion 25 may determine the biometric condition as "good" when the matching success rate of a plurality of previous matching is high, and may determine as "bad" when the matching success rate is low. The biometric condition determine portion 25 may determine the biometric condition as "good" when the similarity of a plurality of previous matching is high, and may determine as "bad" when the similarity is low. The biometric condition determine portion 25 may determine the biometric condition as "good" when the biometric quality is high, and may determine as "bad" when the biometric quality is low.

Here, a description is given of the biometric quality by taking a fingerprint as an example. The biometric quality of fingerprint is sharpness of fingerprint, luminance difference between a ridge line and a valley line of fingerprint, breaking or injury of fingerprint ridge line, an area of fingerprint image, or the like. For example, if the luminance difference between the ridge line and the valley line of fingerprint is small (not sharp), the biometric quality may be determined as "low". If the luminance difference between the ridge line and the valley line of fingerprint is large (sharp), the biometric quality may be determined as "high". If there are many breakings or injuries of fingerprint, the biometric quality may be determined as "low". If there are few breakings or injuries of fingerprint, the biometric quality may be determined as "high". If an area of fingerprint image in an image obtained by the biometric sensor 15 is small, the biometric quality may be determined as "low". If the area is large, the biometric quality may be determined as "high".

When an image suitable for matching cannot be obtained because movement of a finger is inadequate or finger condition is unstable, obtaining of image is failed and matching cannot be performed, and re-input of finger image is demanded. Therefore, the biometric condition determine portion 25 may determine the biometric condition as "good" when the image obtain failure rate is low, and may determine the biometric condition as "bad" when the image obtain failure rate is high.

In general, depending on a person, there is a repeatability in a scan speed. However, it is difficult to use only the scan speed as individual information. And so, the biometric condition determine portion 25 may determine the biometric condition as "good" when the biometric quality is high and there is few difference between scan speeds, and may determine the biometric condition as "bad" when the biometric quality is high and there is large difference between scan speeds.

When the biometric condition determine portion 25 determines the biometric condition as "bad", the auxiliary authentication key validation/invalidation portion 26 makes the auxiliary authentication key valid. When the auxiliary authentication key is becomes valid, the auxiliary authentication key issue portion 27 issues an auxiliary authentication key. The auxiliary authentication key holding portion 32 relates the issued auxiliary authentication key to the user and holds the issued auxiliary authentication key. When the biometric condition determine portion 25 determines the biometric condition as "good", the auxiliary authentication key validation/invalidation portion 26 makes the auxiliary authentication key held by the auxiliary authentication key holding portion 32 invalid.

When the obtained information determine portion 21 determines the auxiliary authentication key as "valid", the auxiliary authentication key obtain portion 28 obtains an auxiliary authentication key that is input to the input-output portion 14 by the user. The auxiliary authentication key matching portion 29 matches the registered auxiliary authentication key held by the auxiliary authentication key holding portion 32 and the auxiliary authentication key for matching obtained by the auxiliary authentication key obtain portion 28. The identification portion 24 determines that the matching is succeeded when the auxiliary authentication key for matching corresponds to the registered auxiliary authentication key, and determines that the matching is failed when the auxiliary authentication key for matching does not correspond to the registered auxiliary authentication key.

The auxiliary authentication key validation/invalidation portion 26 may inform an administrator of the effect when making the auxiliary authentication key valid or invalid. The auxiliary authentication key issue portion 27 may demand inputting a password (specific texts such as birth date) for issuing of the auxiliary authentication key indicated in advance from the user when issuing the auxiliary authentication key. In this case, if the user fails the inputting of the texts predetermined times, the issuing of the auxiliary authentication key may be stopped. The auxiliary authentication key issue portion 27 sets an expiration date for the auxiliary authentication key. The auxiliary authentication key issue portion 27 may demand an allowance of the auxiliary authentication key to from administrator when issuing the auxiliary authentication key, and may issue the auxiliary authentication key after inputting of allowance by the administrator.

In FIG. 2, the auxiliary authentication key issue portion 27, the auxiliary authentication key obtain portion 28, the auxiliary authentication key matching portion 29, and the auxiliary authentication key holding portion 32 act as an alternate matching portion. The auxiliary authentication key validation/invalidation portion 26 acts as an alternate authentication control portion.

Figure 3:
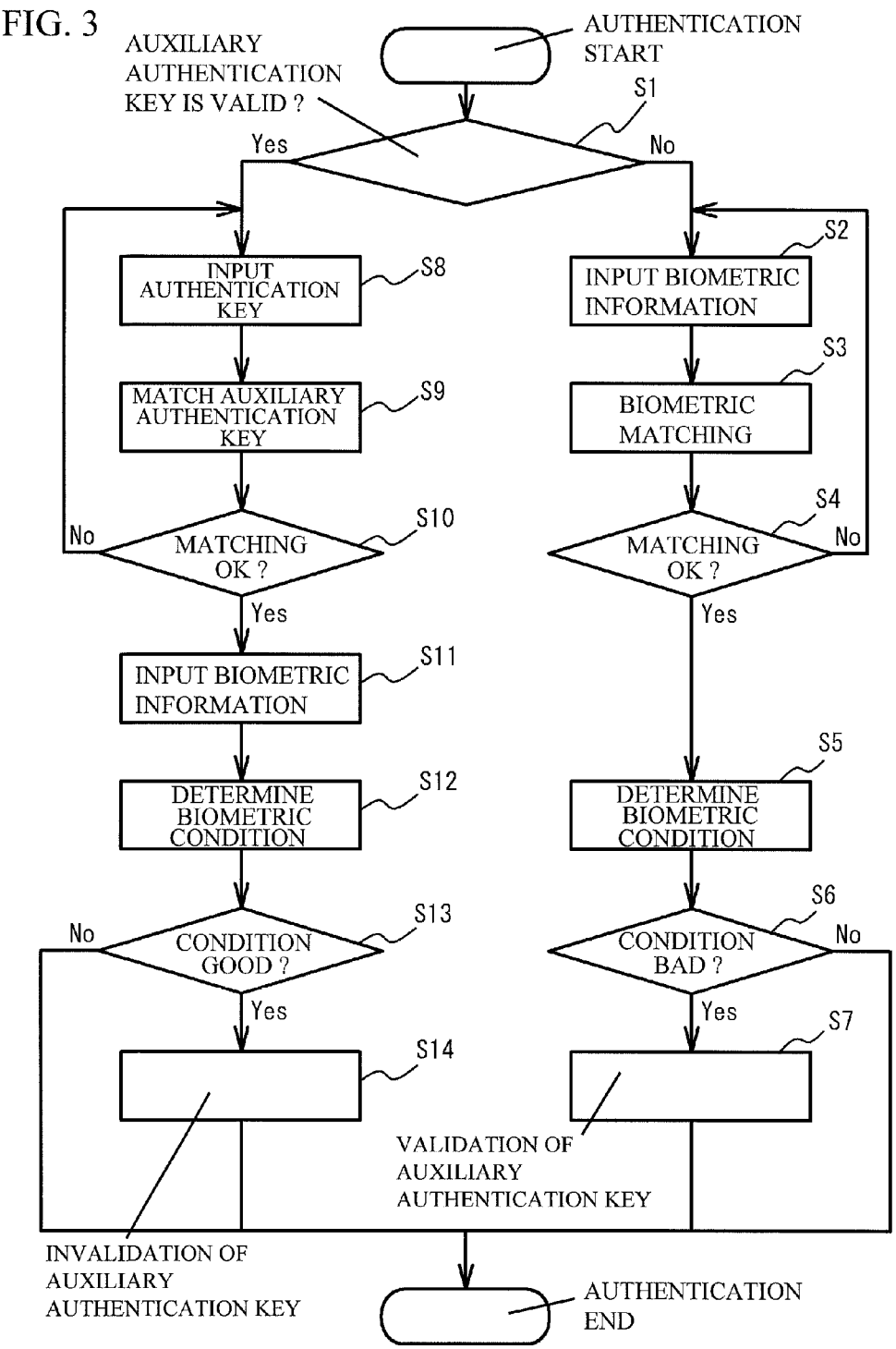
FIG. 3 illustrates an example of a flowchart executed by the biometric authentication device.

FIG. 3 illustrates an example of a flowchart executed by the biometric authentication device 100. As illustrated in FIG. 3, the obtained information determine portion 21 determines whether an auxiliary authentication key is valid or not (Step S1). If it is not determined that the auxiliary authentication key is valid in the Step S1, the biometric information obtain portion 22 obtains biometric information of a user from the biometric sensor 15 (Step S2).

Next, the biometric matching portion 23 matches the biometric information for matching obtained by the biometric information obtain portion 22 and registered biometric information of the user held by the registered biometric information holding portion 31 (Step S3). The identification portion 24 determines whether the matching result is success or not (Step S4). If it is not determined that the matching result is success in the Step S4, the biometric information obtain portion 22 executes the Step S2 again.

If it is determined that the matching result is success in the Step S4, the biometric condition determine portion 25 determines the biometric condition of the user (Step S5). Next, the biometric condition determine portion 25 determines whether the biometric condition of the user is bad or not (Step S6). If it is determined that the biometric condition is bad in the Step S6, the auxiliary authentication key validation/invalidation portion 26 makes the auxiliary authentication key valid (Step S7). In this case, the auxiliary authentication key issue portion 27 relates an auxiliary authentication key to the user and issues the auxiliary authentication key. After that, the execution of the flowchart is terminated. If it is not determined that the biometric condition is bad in the Step S6, the execution of the flowchart is terminated.

If it is determined that the auxiliary authentication key is valid in the Step S1, the auxiliary authentication key obtain portion 28 obtains the auxiliary authentication key of the user from the input-output portion 14 (Step S8). Next, the auxiliary authentication key matching portion 29 matches registered auxiliary authentication key held by the auxiliary authentication key holding portion 32 and the auxiliary authentication key for matching obtained by the auxiliary authentication key obtain portion 28 (Step S9). The identification portion 24 determines whether the matching of the Step S9 is succeeded or nor (Step S10). If it is not determined that the matching is succeeded in the Step S10, the auxiliary authentication key obtain portion 28 executes the Step S8 again.

If it is determined that the matching is succeeded in the Step S10, the biometric information obtain portion 22 obtains biometric information of the user again (Step S11). Next, the biometric condition determine portion 25 determines the biometric condition of the user (Step S12). Next, the biometric condition determine portion 25 determines whether the biometric condition of the user is good or not (Step S13). If it is determined that the biometric condition of the user is good in the Step S13, the auxiliary authentication key validation/invalidation portion 26 makes the auxiliary authentication key of the user invalid (Step S14). After that, the execution of the flowchart is terminated. If it is not determined that the biometric condition is good in the Step S13, the execution of the flowchart is terminated.

As illustrated in the flowchart of FIG. 3, the auxiliary authentication key is usable only in a necessary period, if the auxiliary authentication key validation/invalidation portion 26 makes the auxiliary authentication key valid only when the biometric matching portion 23 succeeds matching and the biometric condition determine portion 25 determines the biometric condition as "bad". Therefore, the security level of the biometric authentication is kept high. It is not necessary for the user or the administrator to determine necessity of the issuing of the auxiliary authentication key. It is therefore possible to solve the complication of validation and invalidation of the auxiliary authentication key.

Figure 4:
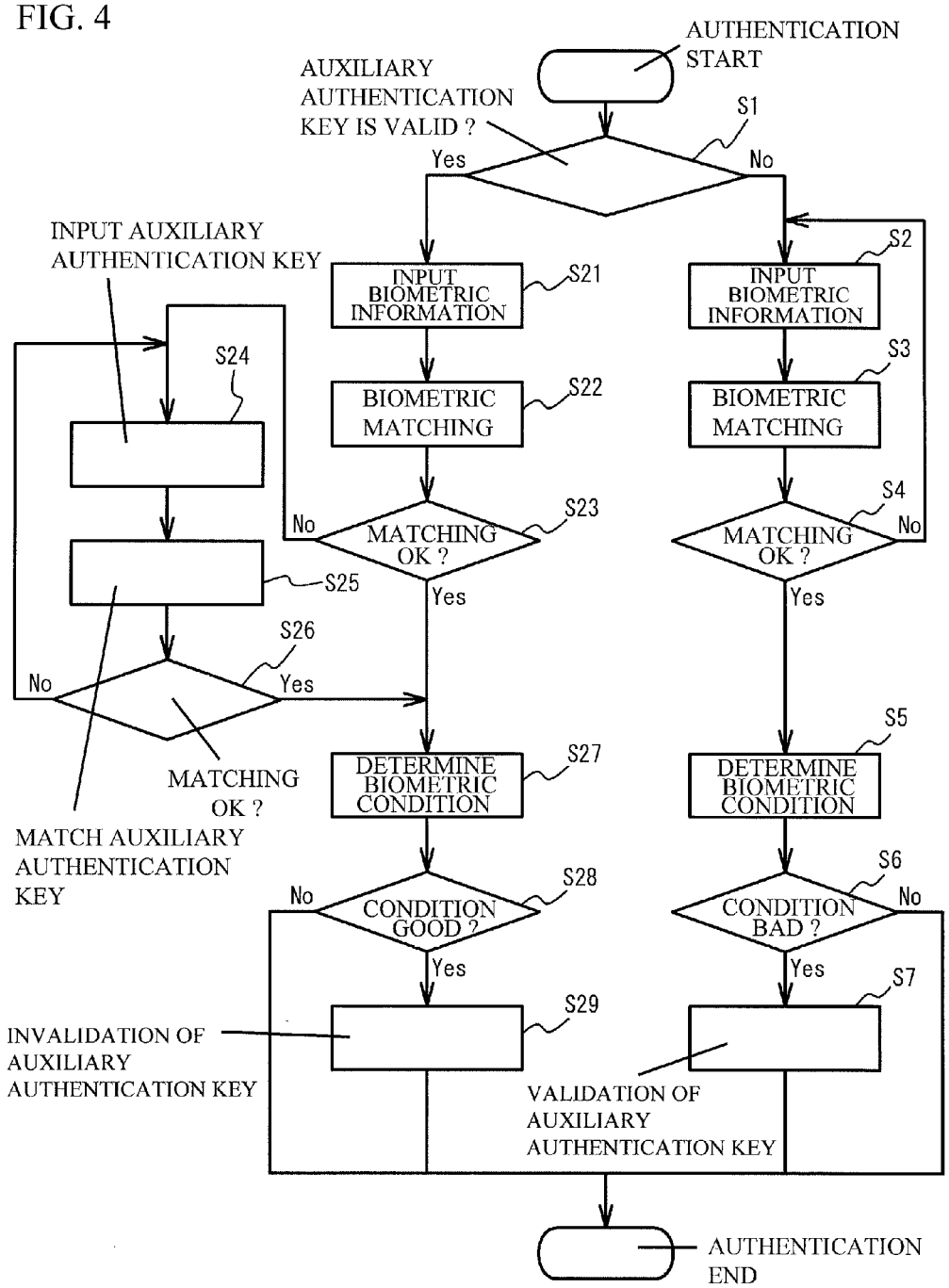
FIG. 4 illustrates another example of a flowchart executed by the biometric authentication device.

FIG. 4 illustrates another example of the flowchart executed by the biometric authentication device 100. The flowchart of FIG. 4 is different from that of FIG. 3, in a point that Steps S21 through S29 are executed instead of the Steps S8 through S14. A description will be given of the Step S21 through S29.

If it is determined that the auxiliary authentication key is valid in the Step S1, the biometric information obtain portion 22 obtains biometric information of the user (Step S21). Next, the biometric matching portion 23 matches the biometric information for matching of the user obtained by the biometric information obtain portion 22 and the registered biometric information of the user held by the registered biometric information holding portion 31 (Step S22). The identification portion 24 determines whether the matching is succeeded or not (Step S23).

If it is not determined that the matching is succeeded in the Step S23, the auxiliary authentication key obtain portion 28 obtains the auxiliary authentication key of the user from the input-output portion 14 (Step S24). Next, the auxiliary authentication key matching portion 29 matches a registered auxiliary authentication key held by the auxiliary authentication key holding portion 32 and the auxiliary authentication key for matching obtained by the auxiliary authentication key obtain portion 28 (Step S25). The identification portion 24 determines whether the matching of the Step S25 is succeeded or not (Step S26). If it is not determined that the matching is succeeded in the Step S26, the auxiliary authentication key obtain portion 28 executes the Step S24 again.

If it is determined that the matching is succeeded in the Step S23 and if it is determined that the matching is succeeded in the Step S26, the biometric condition determine portion 25 determines the biometric condition of the user (Step S27). Next, the biometric condition determine portion 25 determines whether the biometric condition of the user is good or not (Step S28). If it is determined that the biometric condition is good in the Step S28, the auxiliary authentication key validation/invalidation portion 26 makes the auxiliary authentication key invalid (Step S29). After that, the execution of the flowchart is terminated. If it is not determined that the biometric condition is good in the Step S28, the execution of the flowchart is terminated.

As illustrated in the flowchart of FIG. 4, the auxiliary authentication key is usable only in a necessary period, if the auxiliary authentication key validation/invalidation portion 26 makes the auxiliary authentication key valid only when the biometric matching portion 23 succeeds matching and the biometric condition determine portion 25 determines the biometric condition as "bad". Therefore, the security level of the biometric authentication is kept high. And it is possible to solve the complication of validation and invalidation of the auxiliary authentication key.

The biometric condition determine portion 25 may determine the biometric condition as "bad", if a user intentionally places a finger different from a registered finger on the biometric sensor 15. In this case, there is a possibility that an unnecessary auxiliary authentication key is issued. It is therefore preferable that the biometric condition determine portion 25 determines good and bad of the biometric condition with use of the biometric quality.

Figure 5:
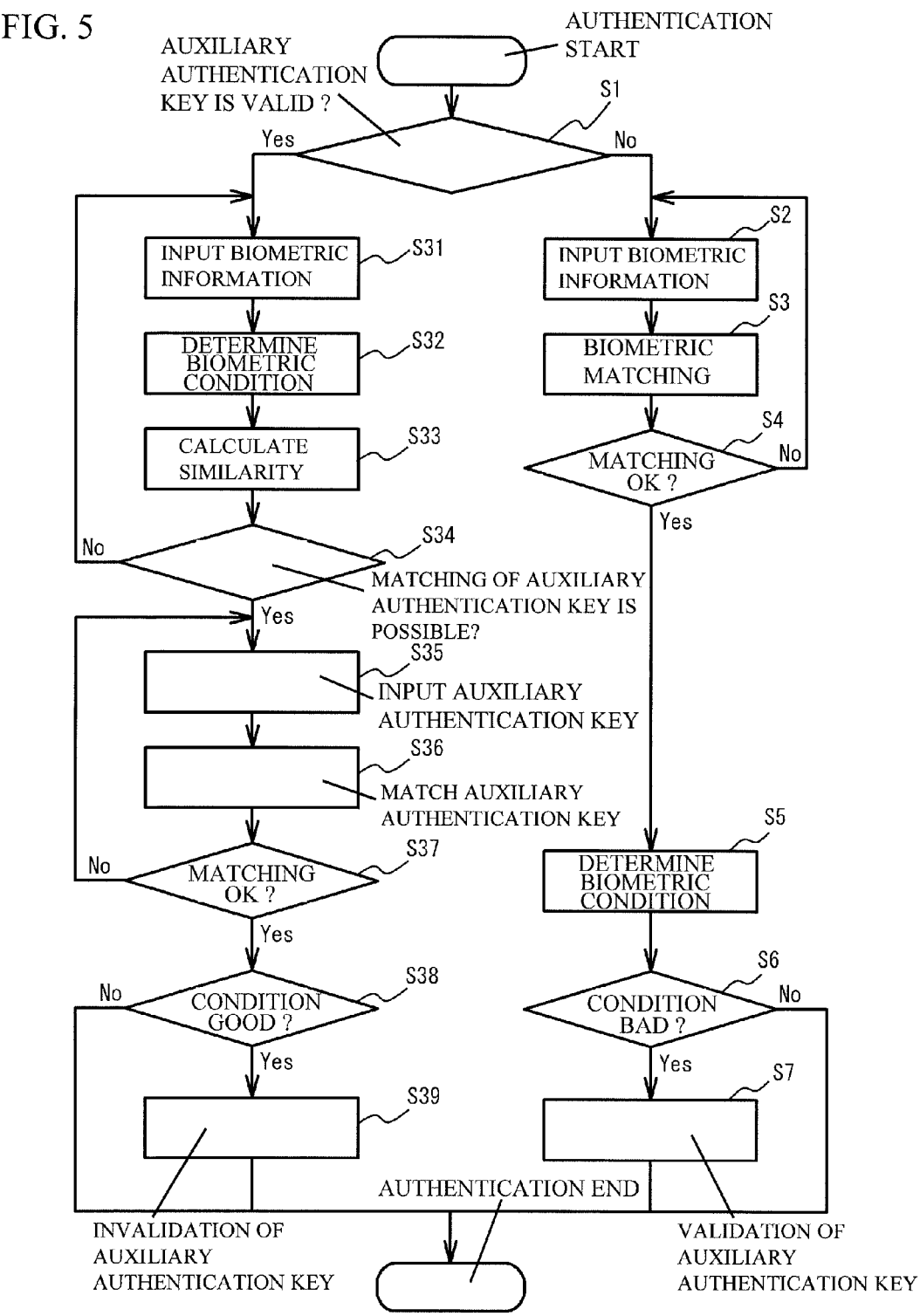
FIG. 5 illustrates another example of a flowchart executed by the biometric authentication device.

FIG. 5 illustrates another example of the flowchart executed by the biometric authentication device 100. The flowchart of FIG. 5 is different from that of FIG. 3, in a point that Steps S31 through S39 are executed instead of the Steps S8 through S14. A description will be given of the Steps S31 through S39.

If it is determined that the auxiliary authentication key is valid in the Step S1, the biometric information obtain portion 22 obtains biometric information of the user (Step S31). Next, the biometric condition determine portion 25 determines the biometric condition (Step S32). In a case where fingerprint information is used as the biometric information, the biometric condition determine portion 25 determines sharpness of a ridge line of fingerprint, luminance difference between a ridge line and a valley line of fingerprint, breaking or injury of fingerprint ridge line, area of fingerprint image or the like with respect to the fingerprint information obtained by the biometric information obtain portion 22.

Next, the biometric matching portion 23 calculates a similarity between the biometric information obtained by the biometric information obtain portion 22 and registered biometric information held by the registered biometric information holding portion 31 (Step S33). Next, the auxiliary authentication key validation/invalidation portion 26 determines whether the matching of the auxiliary authentication key is possible or not based on the result of the Step S32 and the Step S33 (Step S34). In concrete, the auxiliary authentication key validation/invalidation portion 26 determines that the matching of the auxiliary authentication key is impossible when the similarity calculated in the Step S33 is less than a threshold, even if the fingerprint condition obtained in the Step S32 is good. In other cases, the auxiliary authentication key validation/invalidation portion 26 determines that the matching of the auxiliary authentication key is possible.

If it is not determined that the matching of the auxiliary authentication key is possible in the Step S34, the Step S31 is executed again. If it is determined that the matching of the auxiliary authentication key is possible in the Step S34, the auxiliary authentication key obtain portion 28 obtains an auxiliary authentication key of the user from the input-output portion 14 (Step S35). Next, the auxiliary authentication key matching portion 29 matches a registered auxiliary authentication key held by the auxiliary authentication key holding portion 32 and the auxiliary authentication key for matching obtained by the auxiliary authentication key obtain portion 28 (Step S36). The identification portion 24 determines whether the matching of the Step S36 is succeeded or not (Step S37). If it is not determined that the matching is succeeded in the Step S37, the auxiliary authentication key obtain portion 28 executes the Step S35 again.

If it is determined the matching is succeeded in the Step S37, the biometric condition determine portion 25 determines whether the biometric condition of the user is good or not (Step S38). If it is determined that the biometric condition of the user is good in the Step S38, the auxiliary authentication key validation/invalidation portion 26 makes the auxiliary authentication key of the user invalid (Step S39). After that, the execution of the flowchart is terminated. If it is not determined that the biometric condition is good in the Step S38, the execution of the flowchart is terminated.

As illustrated in FIG. 5, the auxiliary authentication key is usable only in a necessary period, if the auxiliary authentication key validation/invalidation portion 26 makes the auxiliary authentication key valid only when the biometric matching portion 23 succeeds matching and the biometric condition determine portion 25 determines the biometric condition as "bad". Therefore, the security level of the biometric authentication is kept high. And it is possible to solve the complication of validation and invalidation of the auxiliary authentication key. The biometric matching portion 23 does not perform an authentication when the similarity between the biometric information for matching and the registered biometric information is low, even if the biometric condition determine portion 25 determines the biometric condition as "good". Therefore, an error authentication of a person plagiarizing the auxiliary authentication key is prevented.

Figure 6:
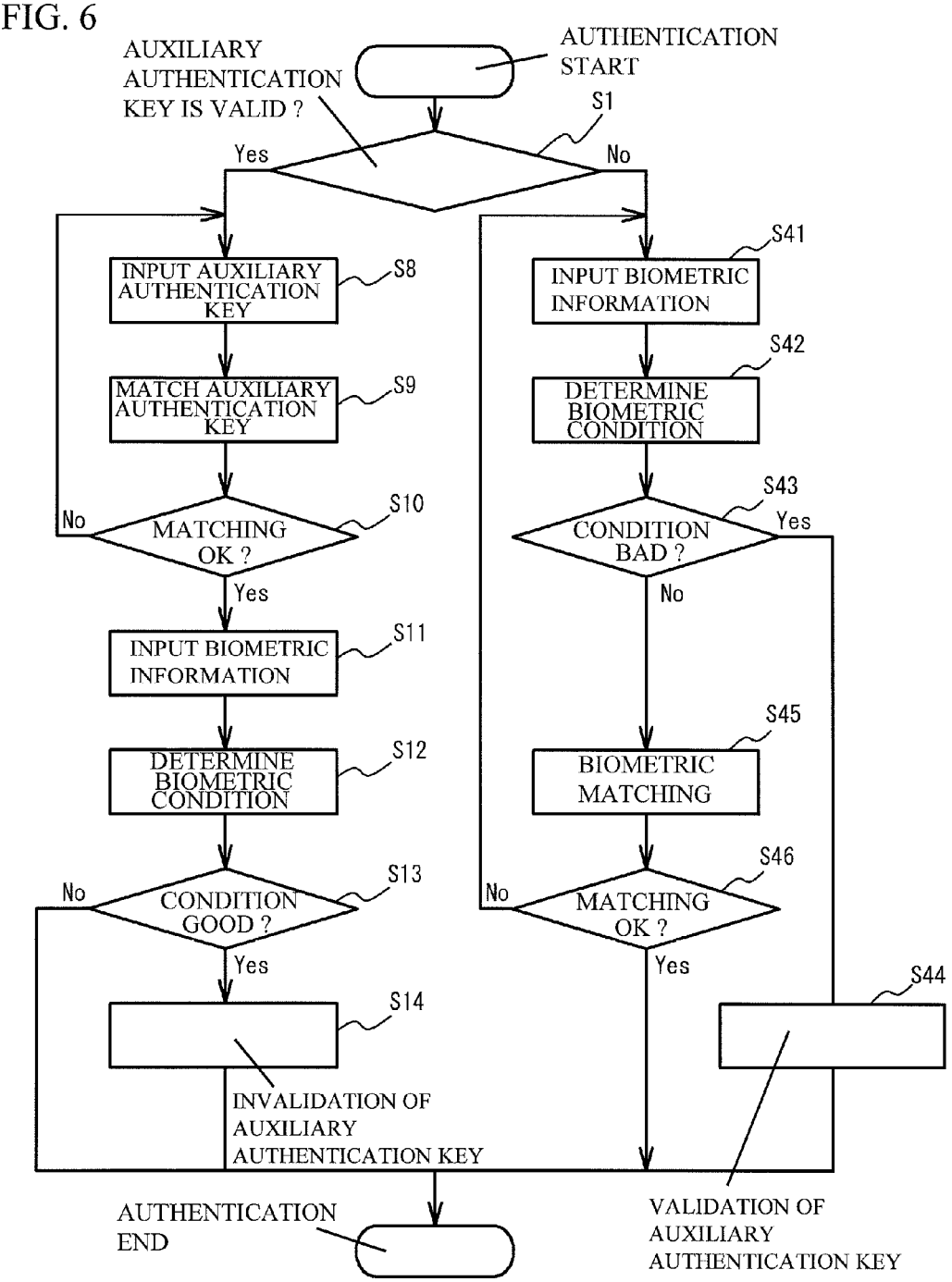
FIG. 6 illustrates another example of a flowchart executed by the biometric authentication device.

FIG. 6 illustrates another example of the flowchart executed by the biometric authentication device 100. The flowchart of FIG. 6 is different from that of FIG. 3, in a point that Steps S41 through S46 are executed instead of the Steps S2 through S7. A description will be given of the Steps S41 through S46.

If it is not determined that the auxiliary authentication key is valid in the Step S1, the biometric information obtain portion 22 obtains biometric information of the user from the biometric sensor 15 (Step S41). Next, the biometric condition determine portion 25 determines the biometric condition (Step S42). In a case where fingerprint information is used as the biometric information, the biometric condition determine portion 25 determines sharpness of a ridge line of fingerprint, luminance difference between a ridge line and a valley line of fingerprint, breaking or injury of fingerprint ridge line, area of fingerprint image or the like with respect to the fingerprint information obtained by the biometric information obtain portion 22.

Next, the biometric condition determine portion 25 determines whether the biometric condition of the user is bad or not (Step S43). If it is determined that the biometric condition is bad in the Step S43, the auxiliary authentication key validation/invalidation portion 26 makes the auxiliary authentication key of the user valid (Step S44). After that, the execution of the flowchart is terminated. If it is not determined that the biometric condition is bad in the Step S43, the biometric matching portion 23 matches the biometric information for matching of the user obtained by the biometric information obtain portion 22 and registered biometric information of the user held by the registered biometric information holding portion 31 (Step S45). Next, the identification portion 24 determines whether the matching is succeeded or not (Step S46). If it is not determined that the matching is succeeded in the Step S46, the biometric information obtain portion 22 executes the Step S41. If it is determined that the matching is succeeded in the Step S46, the execution of the flowchart is terminated.

In FIG. 3 to FIG. 5, the user is not authenticated unless a user succeeds the biometric authentication, if the auxiliary authentication key is made to be invalid. However, there is a case where the user fails the biometric authentication when the fingerprint condition gets worse drastically or when the fingerprint is used at long intervals. As illustrated in the flowchart of FIG. 6, the auxiliary authentication key validation/invalidation portion 26 makes the auxiliary authentication key valid when the biometric condition determine portion 25 determines the biometric condition as "bad", even if the biometric matching portion 23 fails the matching. It is therefore possible to restrain degradation of convenience of the user.

Figure 7:
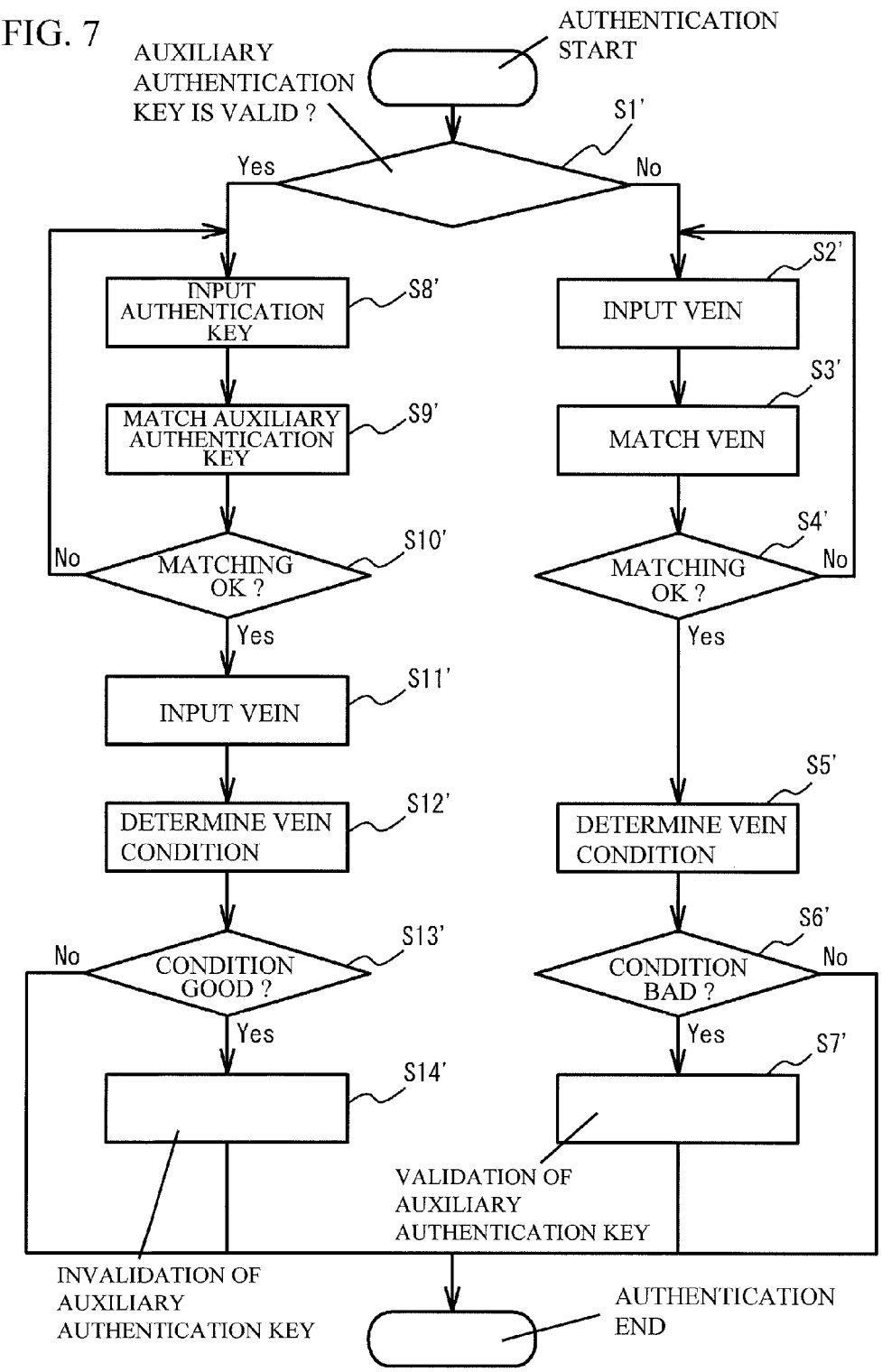
FIG. 7 illustrates another example of a flowchart executed by the biometric authentication device.

FIG. 7 illustrates another example of the flowchart executed by the biometric authentication device 100. In the example, a vein sensor is used as the biometric sensor 15. The flowchart of FIG. 7 is different from that of FIG. 3 in a point that a vein authentication is performed instead of the fingerprint authentication.

Figure 8:
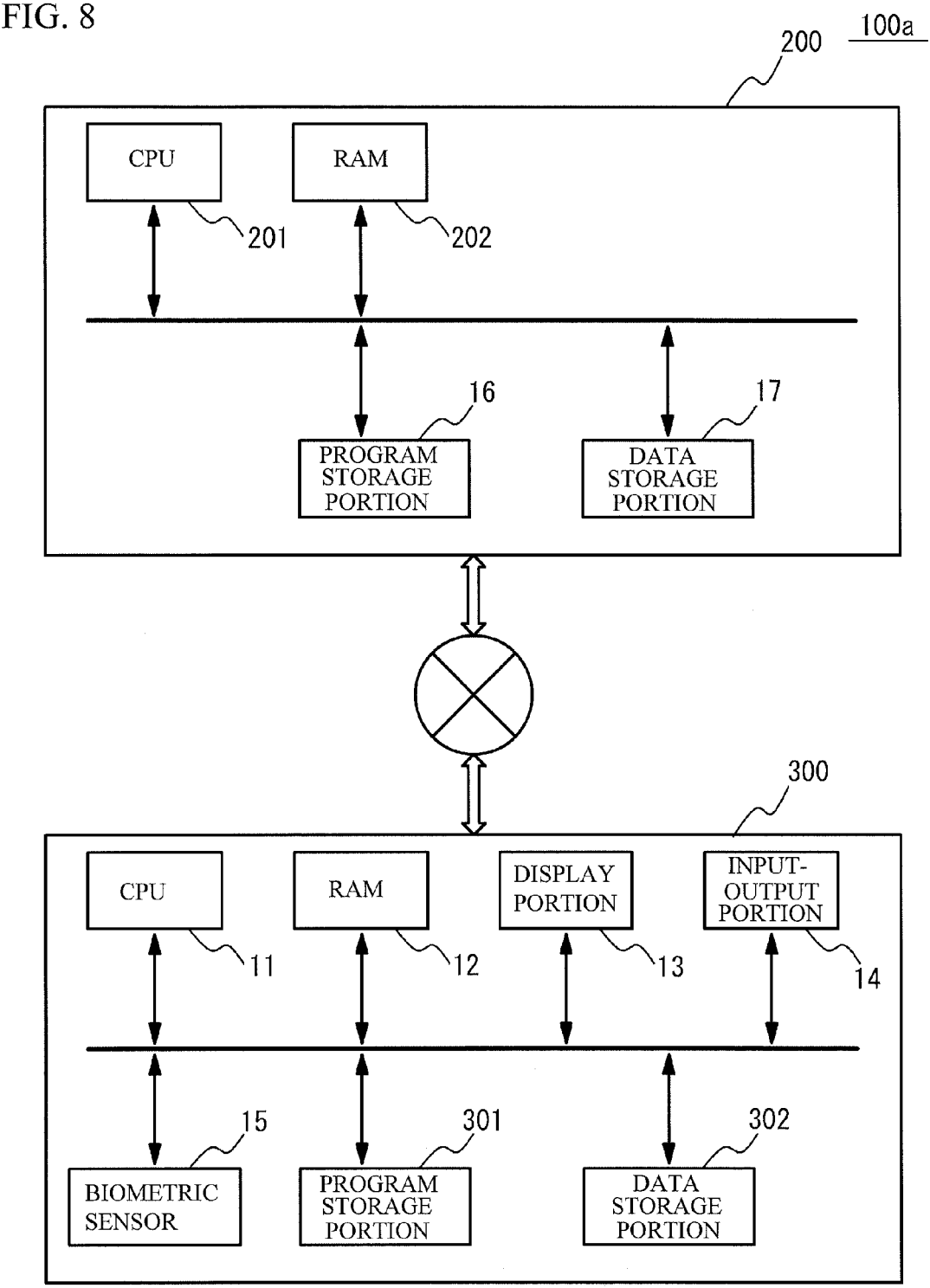
FIG. 8 illustrates a component structure of a biometric authentication device in accordance with an embodiment 2.

FIG. 8 illustrates a component structure of a biometric authentication device 100a in accordance with an embodiment 2. As illustrated in FIG. 8, the biometric authentication device 100a has a structure in which a server 200 is coupled to and communicates with a client terminal 300 via a network. A communication network such as a public line network, Internet or an intranet may be used as the network.

The server 200 has a CPU 201, a RAM 202, the program storage portion 16, the data storage portion 17 of FIG. 1 and so on. The client terminal 300 has a program storage portion 301, a data storage portion 302, the CPU 11, the RAM 12, the display portion 13, the input-output portion 14, the biometric sensor 15 of FIG. 1 and so on.

The obtained information determine portion 21, the biometric information obtain portion 22, the biometric matching portion 23, the identification portion 24, the biometric condition determine portion 25, the auxiliary authentication key validation/invalidation portion 26, the auxiliary authentication key issue portion 27, the auxiliary authentication key obtain portion 28 and the auxiliary authentication key matching portion 29 of FIG. 2 operate when the CPU 201 executes the program stored in the program storage portion 16. The biometric authentication device may be structured with a plurality of computers as in the case of the embodiment.

Figure 9:
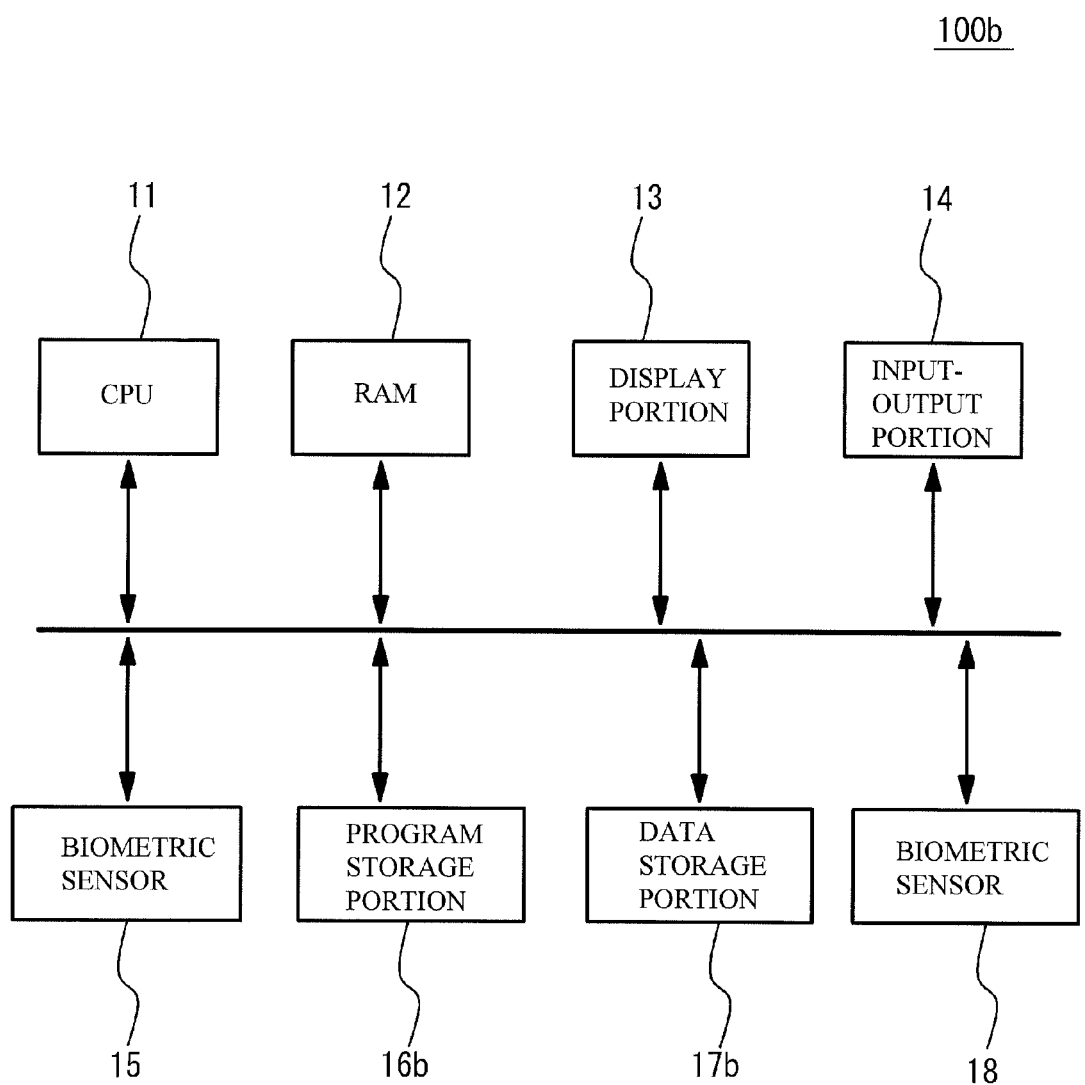
FIG. 9 illustrates a component structure of a biometric authentication device in accordance with an embodiment 3.
Figure 10:
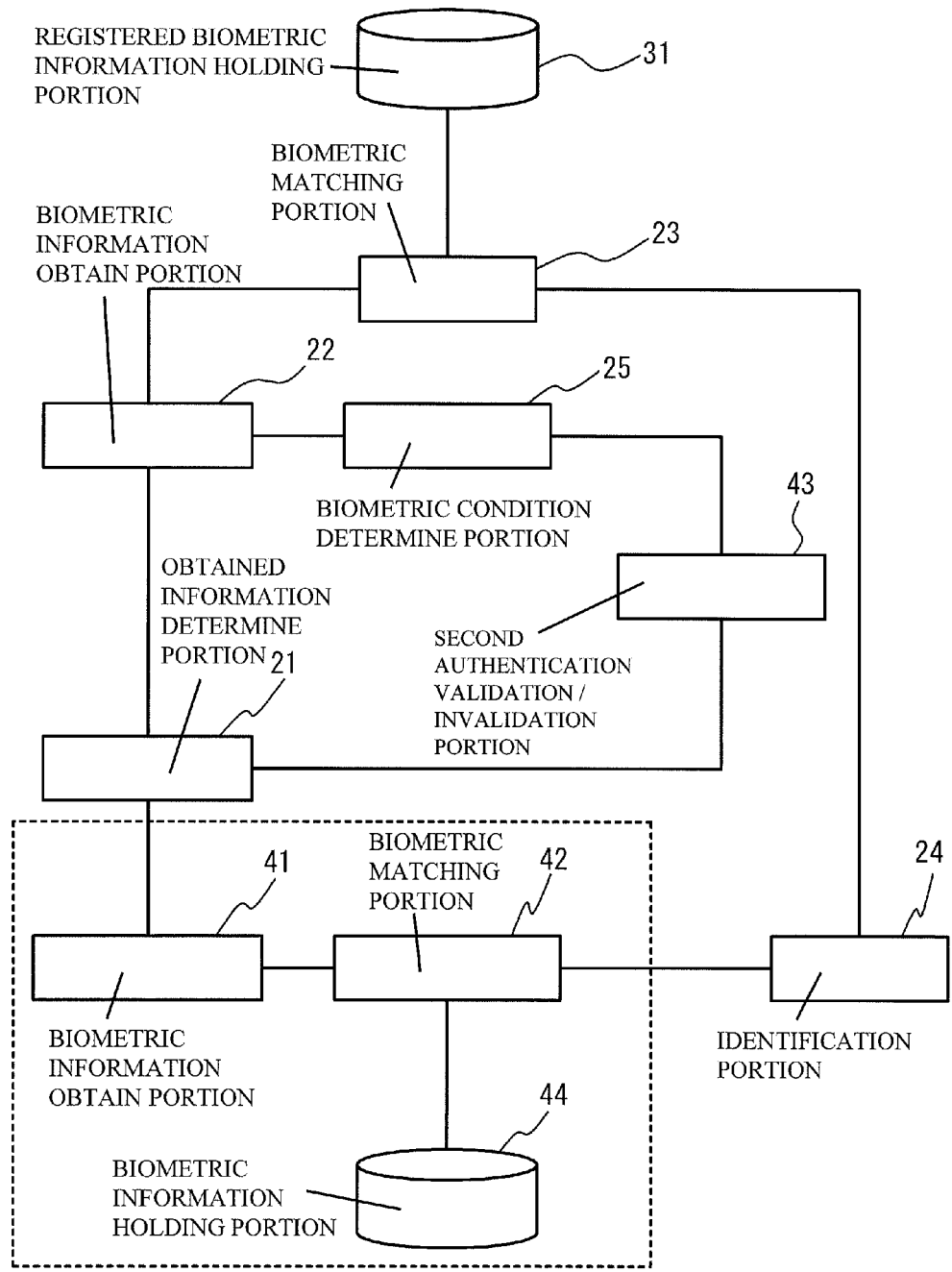
FIG. 10 illustrates a function block diagram of the biometric authentication device in accordance with the embodiment 3.

FIG. 9 illustrates a component structure of a biometric authentication device 100b in accordance with an embodiment 3. FIG. 10 illustrates a function block diagram of the biometric authentication device 100b. The biometric authentication device 100b is different from the biometric authentication device 100 of FIG. 1 in points that a biometric sensor 18 is further provided, and a program storage portion 16b and a data storage portion 17b are provided instead of the program storage portion 16 and the data storage portion 17.

The biometric sensor 18 is a sensor for detecting biometric information that is different from the biometric information obtained by the biometric sensor 15. For example, in a case where a fingerprint sensor is used as the biometric sensor 15, a vein sensor may be used as the biometric sensor 18.

The obtained information determine portion 21, the biometric information obtain portion 22, the biometric matching portion 23, the identification portion 24, the biometric condition determine portion 25, a biometric information obtain portion 41, a biometric matching portion 42 and a second biometric authentication validation/invalidation portion 43 operate when the CPU 11 executes the program stored in the program storage portion 16b. The data storage portion 17b acts as the registered biometric information holding portion 31 and the registered biometric information holding portion 44 of FIG. 1. In the embodiment, the auxiliary authentication key validation/invalidation portion 26, the auxiliary authentication key obtain portion 28 and the auxiliary authentication key matching portion 29 of FIG. 1 fail to operate in the embodiment.

A description will be given of an operation of the biometric matching portion 42 and the second biometric authentication validation/invalidation portion 43. In the embodiment, the obtained information determine portion 21 determines whether the second biometric authentication is valid or invalid. If the obtained information determine portion 21 determines that the second biometric authentication is invalid, the biometric matching portion 23 performs the biometric matching as in the case of the embodiment 1.

If the obtained information determine portion 21 determines that the second biometric authentication is valid, the biometric information obtain portion 41 obtains vein information of the user from the biometric sensor 18. The registered biometric information holding portion 44 holds registered vein information of each user. The biometric matching portion 42 matches the vein information for matching of the user obtained by the biometric information obtain portion 41 and registered vein information of the user held by the registered biometric information holding portion 44. The identification portion 24 determines that the matching is succeeded when the similarity between the vein information for matching and the registered vein information is equal to a predetermined value or more, and determines that the matching is not succeeded when the similarity between the vein information for matching and the registered vein information is less than the predetermined value. If the biometric condition determine portion 25 determines the biometric condition as "bad", the second biometric authentication validation/invalidation portion 43 makes the second biometric authentication valid. If the biometric condition determine portion 25 determines the biometric condition as "good", the second biometric authentication validation/invalidation portion 43 makes the second biometric authentication invalid.

In FIG. 10, the biometric information obtain portion 41, the biometric matching portion 42 and the registered biometric information holding portion 44 act as an alternate authentication portion. The second biometric authentication validation/invalidation portion 43 acts as an alternate authentication control portion.

Figure 11:
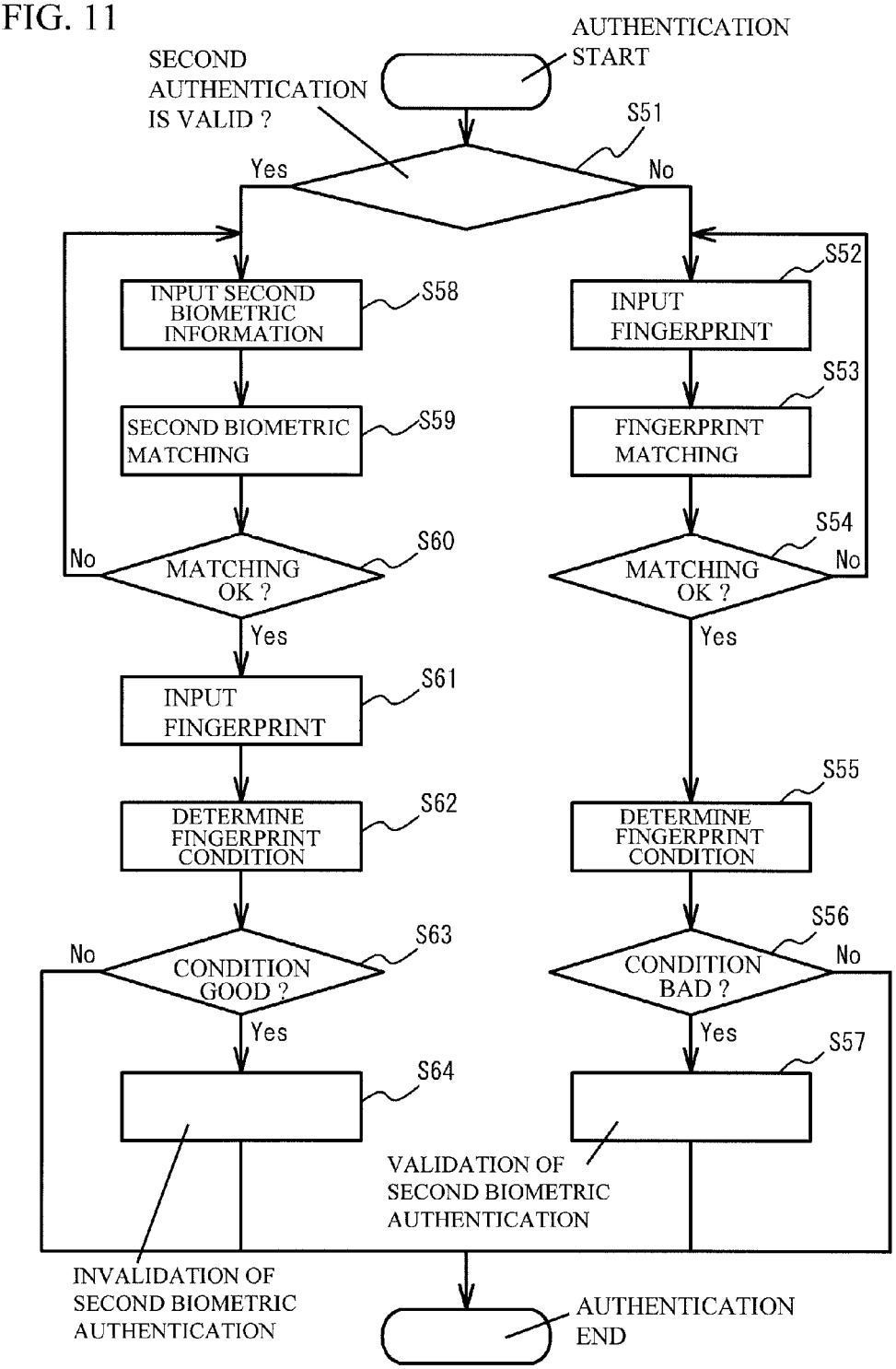
FIG. 11 illustrates an example of a flowchart executed by the biometric authentication device in accordance with the embodiment 3.

FIG. 11 illustrates an example of a flowchart executed by the biometric authentication device 100b. As illustrated in FIG. 11, the obtained information determine portion 21 determines whether the second biometric authentication is valid or not (Step S51). If it is not determined that the second biometric authentication is valid in the Step S51, the biometric information obtain portion 22 obtains the fingerprint information from the biometric sensor 15 (Step S52).

Next, the biometric matching portion 23 matches the fingerprint information for matching of the user obtained by the biometric information obtain portion 22 and registered biometric information of the user held by the registered biometric information holding portion 31 (Step S53). The identification portion 24 determines whether the matching is succeeded or not (Step S54). If it is not determined that the matching is succeeded in the Step S54, the biometric information obtain portion 22 executes the Step S52 again.

If it is determined that the matching is succeeded in the Step S54, the biometric condition determine portion 25 determines the fingerprint condition of the user (Step S55). Next, the biometric condition determine portion 25 determines whether the fingerprint condition of the user is bad or not (Step S56). If it is determined that the fingerprint condition is bad in the Step S56, the second biometric authentication validation/invalidation portion 43 makes the second biometric authentication valid (Step S57). After that, the execution of the flowchart is terminated. If it is not determined that the fingerprint condition is bad in the Step S56, the execution of the flowchart is terminated.

If it is determined that the second biometric authentication is valid in the Step S51, the biometric information obtain portion 41 obtains vein information from the biometric sensor 18 (Step S58). Next, the biometric matching portion 42 matches the vein information for matching of the user obtained by the biometric information obtain portion 41 and registered biometric information of the user held by the registered biometric information holding portion 31 (Step S59). The identification portion 24 determines whether the matching is succeeded or not (Step S60). If it is not determined that the matching is succeeded in the Step S60, the biometric information obtain portion 22 executes the Step S58 again.

If it is determined that the matching is succeeded in the Step S60, the biometric information obtain portion 22 obtains fingerprint information of the user from the biometric sensor 15 again (Step S61). Next, the biometric condition determine portion 25 determines the fingerprint condition of the user (Step S62). Next, the biometric condition determine portion 25 determines whether the fingerprint condition of the user is good or not (Step S63). If it is determined that the fingerprint condition is good in the Step S63, the second biometric authentication validation/invalidation portion 43 makes the second biometric authentication of the user invalid (Step S64). After that, the execution of the flowchart is terminated. If it is not determined that the fingerprint condition is good in the Step S63, the execution of the flowchart is terminated.

As illustrated in the flowchart of FIG. 11, if the biometric condition determine portion 25 determines that the fingerprint condition is bad in FIG. 10, the second biometric authentication validation/invalidation portion 43 makes the second biometric authentication valid. Therefore, the complication of validation and invalidation of the second biometric authentication can be solved. In addition, the biometric matching portion 42 performs another biometric authentication as an alternate authentication. Therefore, the security level of the biometric authentication may be improved.

Figure 12:
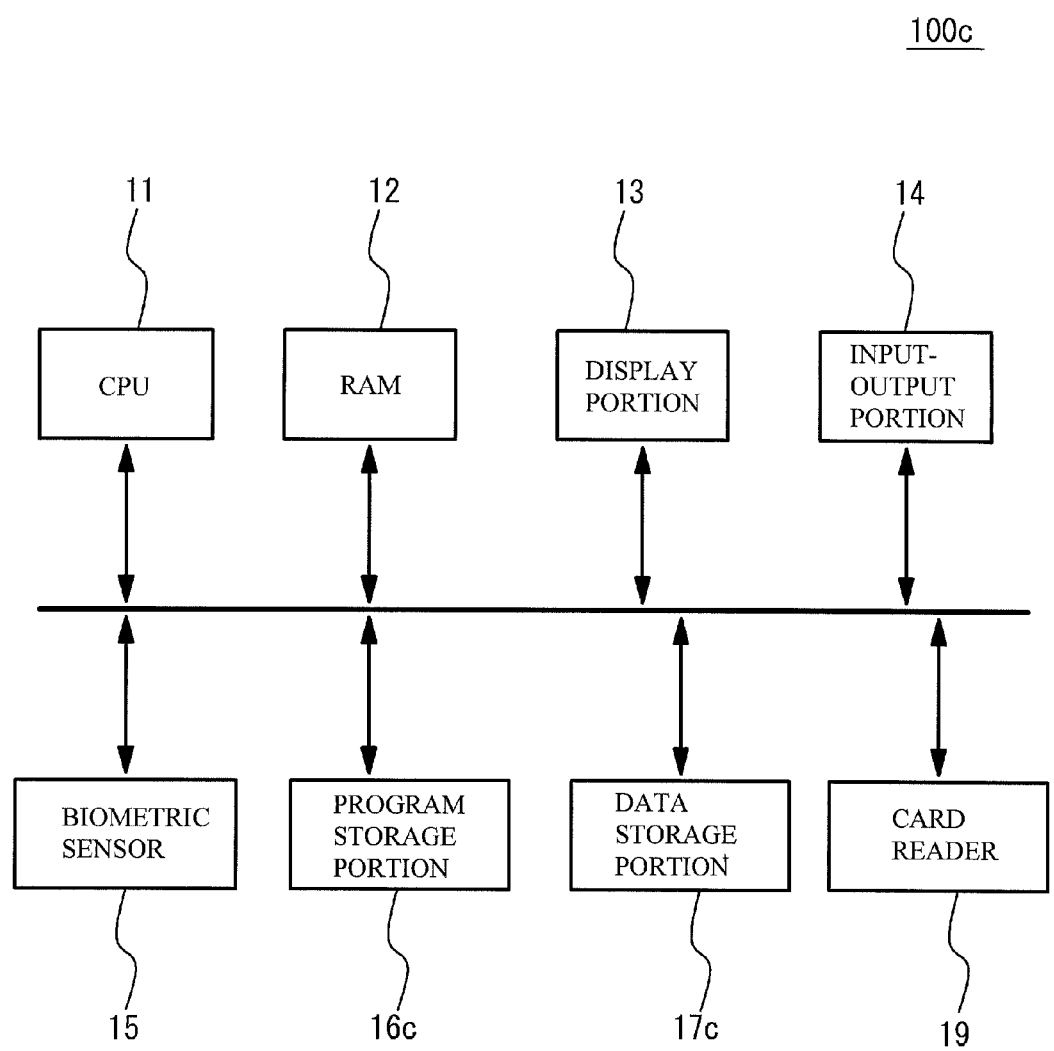
FIG. 12 illustrates a component structure of a biometric authentication device in accordance with an embodiment 4.
Figure 13:
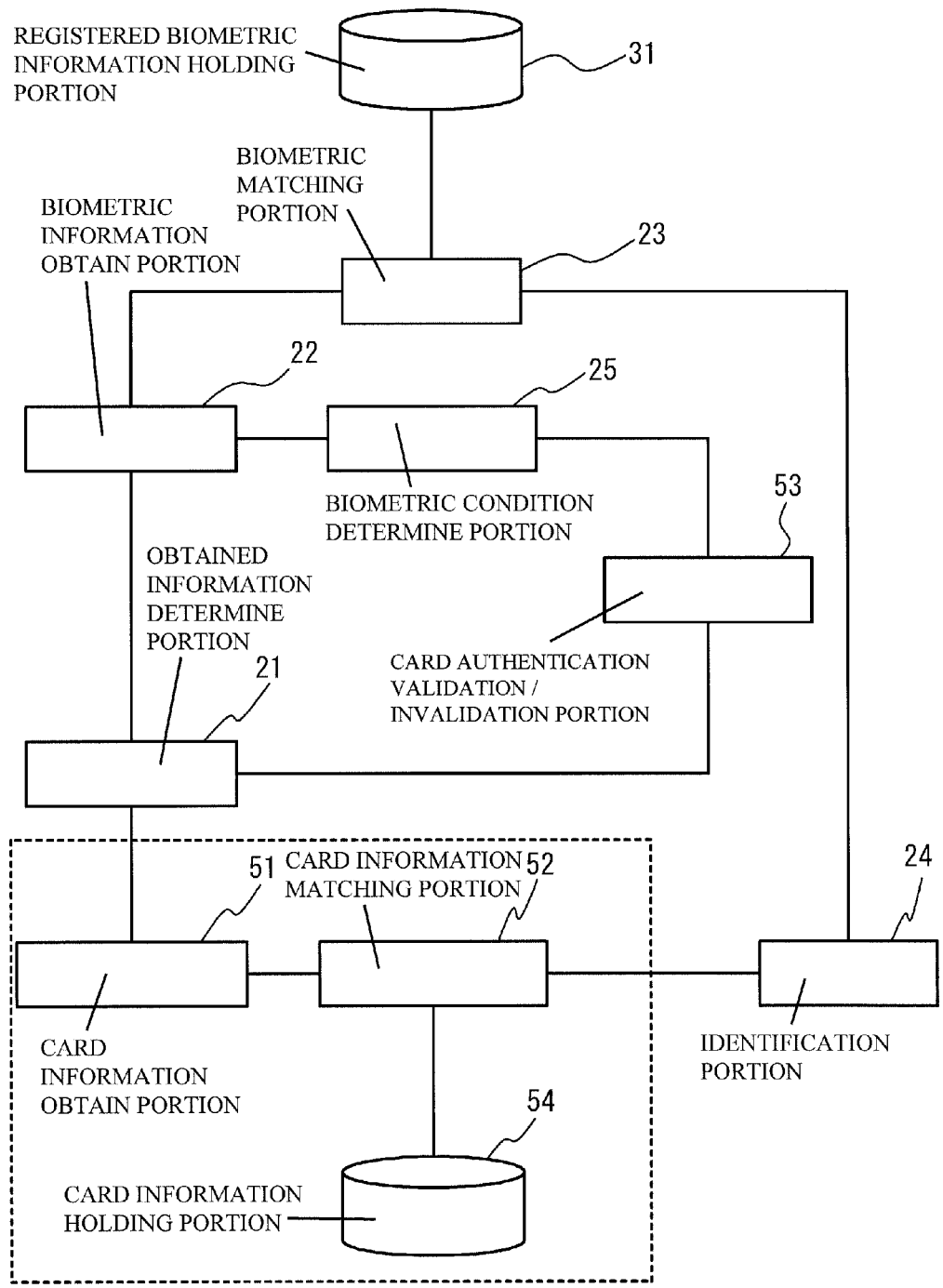
FIG. 13 illustrates a function block diagram of the biometric authentication device in accordance with the embodiment 4.

FIG. 12 illustrates a component structure of the biometric authentication device 100c in accordance with an embodiment 4. FIG. 13 illustrates a function block diagram of the biometric authentication device 100c. The biometric authentication device 100c is different from the biometric authentication device 100 in points that a card reader 19 is further provided, and a program storage portion 16c and a data storage portion 17c are provided instead of the program storage portion 16 and the data storage portion 17. The card reader 19 is a reading device of information held by an IC card.

The obtained information determine portion 21, the biometric information obtain portion 22, the biometric matching portion 23, the identification portion 24, the biometric condition determine portion 25, a card information obtain portion 51, a card information matching portion 52 and a card authentication validation/invalidation portion 53 operate when the CPU 11 executes the program stored in the program storage portion 16c. The data storage portion 17c acts as the registered biometric information holding portion 31 of FIG. 1 and the card information holding portion 54. In the embodiment, the auxiliary authentication key validation/invalidation portion 26, the auxiliary authentication key obtain portion 28 and the auxiliary authentication key matching portion 29 of FIG. 1 fail to operate in the embodiment.

A description will be given of an operation of the card information obtain portion 51, the card information matching portion 52 and the card authentication validation/invalidation portion 53. In the embodiment, the obtained information determine portion 21 determines whether the card authentication is valid or not. If the obtained information determine portion 21 determines that the card authentication is invalid, the biometric matching portion 23 performs the biometric matching as in the case of the embodiment 1.

If the obtained information determine portion 21 determines that the card authentication is invalid, the card information obtain portion 51 obtains card information for matching from a card medium such as an IC card inserted into the card reader 19. The card information holding portion 54 holds registered card information of each user. The card information matching portion 52 matches the card information for matching of the user obtained by the card information obtain portion 51 and registered card information of the user held by the card information holding portion 54. The identification portion 24 determines the matching is succeeded when the card information for matching corresponds to the registered card information of the user, and determines that the matching is not succeeded when the card information for matching fails to correspond to the registered card information. If the biometric condition determine portion 25 determines that the biometric condition is bad, the card authentication validation/invalidation portion 53 makes the card authentication valid. If the biometric condition determine portion 25 determines that the biometric condition is good, the card authentication validation/invalidation portion 53 makes the card authentication invalid.

The card information obtain portion 51, the card information matching portion 52 and the card information holding portion 54 act as an alternate authentication portion. The card authentication validation/invalidation portion 53 acts as an alternate authentication control portion.

FIG. 14 illustrates an example of a flowchart executed by the biometric authentication device 100c. As illustrated in FIG. 14, the obtained information determine portion 21 determines whether the card authentication is valid or not (Step S71). If it is not determined that the card authentication is valid in the Step S71, the biometric information obtain portion 22 obtains fingerprint information of a user from the biometric sensor 15 (Step S72).

Next, the biometric matching portion 23 matches the fingerprint information for matching of the user obtained by the biometric information obtain portion 22 and registered fingerprint information of the user held by the registered biometric information holding portion 31 (Step S73). The identification portion 24 determines whether the matching is succeeded or not (Step S74). If it is not determined that the matching is succeeded in the Step S74, the biometric information obtain portion 22 executes the Step S72 again.

If it is determined that the matching is succeeded in the Step S74, the biometric condition determine portion 25 determines the fingerprint condition of the user (Step S75). Next, the biometric condition determine portion 25 determines whether the fingerprint condition of the user is bad or not (Step S76). If it is determined that the fingerprint condition is bad in the Step S76, the card authentication validation/invalidation portion 53 makes the card authentication valid (Step S77). After that, the execution of the flowchart is terminated. If it is not determined that the fingerprint condition is bad in the Step S76, the execution of the flowchart is terminated.

If it is determined that the card authentication is valid in the Step S71, the card information obtain portion 51 obtains card information from an IC card inserted into the card reader 19 (Step S78). Next, the card information matching portion 52 matches the card information of the user obtained by the card information obtain portion 51 and registered card information of the user held by the registered card information holding portion 54 (Step S79). The identification portion 24 determines whether the matching is succeeded or not (Step S80). If it is not determined that the matching is succeeded in the Step S80, the biometric information obtain portion 22 executes the Step S78 again.

If it is not determined that the matching is succeeded in the Step S80, the biometric information obtain portion 22 obtains fingerprint information of the user again from the biometric sensor 15 (Step S81). Next, the biometric condition determine portion 25 determines the fingerprint condition of the user (Step S82). Next, the biometric condition determine portion 25 determines whether the fingerprint information of the user is good or not (Step S83). If it is determined that the fingerprint condition is good in the Step S83, the card authentication validation/invalidation portion 53 makes the card authentication of the user invalid (Step S84). After that, the execution of the flowchart is terminated. If it is not determined that the fingerprint condition is good in the Step S83, the execution of the flowchart is terminated.

As illustrated in the flowchart of FIG. 14, the card authentication is usable only in a necessary period, if the card authentication validation/invalidation portion 53 makes the card authentication valid only when the biometric matching portion 23 succeeds matching and the biometric condition determine portion 25 determines the biometric condition as "bad". Therefore, the security level of the biometric authentication is kept high. And it is possible to solve the complication of validation and invalidation of the card authentication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A biometric authentication device comprising:
   a biometric information obtain portion that obtains biometric information of a user;
   a biometric condition determine portion that determines good and bad of biometric condition of the user according to one or more biometric information of the user obtained by the biometric information obtain portion;
   a biometric matching portion that performs a matching between registered biometric information registered in advance and the one or more biometric information when the biometric condition is determined to be good by the biometric condition determine portion;
   an alternate authentication portion that performs an alternate authentication based on information that is different from the biometric information; an alternate authentication control portion that makes the alternate authentication of the alternate authentication portion valid when the biometric condition is determined to be bad by the biometric condition determine portion; and
   an informing portion that informs an administrator of validation of the alternate authentication when the alternate authentication is made to be valid and informs the administrator of invalidation of the alternate authentication when the alternate authentication is made to be invalid.

2. The biometric authentication device as claimed in claim 1, wherein:
   the alternate authentication portion performs the alternate authentication based on alternate information input by a user and another alternate information that is issued when the alternate authentication is made to be valid or that is registered in advance; and
   the biometric authentication device has an authentication portion that performs an authentication based on at least one of the matching results of the biometric matching portion and the alternate authentication portion.

3. The biometric authentication device as claimed in claim 1, wherein the biometric condition determine portion determines good and bad of the biometric condition based on a success rate of matching performed by the biometric matching portion.

4. The biometric authentication device as claimed in claim 1, wherein the biometric condition determine portion determines good and bad based on biometric information obtained plural times by the biometric condition obtain portion.

5. The biometric authentication device as claimed in claim 2, further comprising a password demand portion that demands inputting of a predetermined indicated password from the user when the alternate authentication information is issued.

6. The biometric authentication device as claimed in claim 2, further comprising a demand portion that demands issuing of the alternate authentication information from an administrator when the alternate authentication is made to be valid.

7. The biometric authentication device as claimed in claim 1, wherein the alternate matching is an authentication based on a matching result between second biometric information of the user registered in advance and another second biometric information input by the user.

8. The biometric authentication device as claimed in claim 1, wherein the alternate authentication is an authentication based on a matching result between IC card information of the user registered in advance and another IC card information input by the user.

9. A biometric authentication method comprising:
   obtaining biometric information of a user;
   determining, using a processor, good and bad of biometric condition of the user according to one or more biometric information of the user obtained in the obtaining of biometric information;
   performing, using the processor, a matching between registered biometric information registered in advance and the one or more biometric information when the biometric condition is determined to be good in the determining of the biometric condition;

making, using the processor, an alternate authentication based on information that is different from the biometric information valid when the biometric condition is determined to be bad in the determining of the biometric condition; and informing, using the processor, an administrator of validation of the alternate authentication when the alternate authentication is made to be valid and informing, using the processor, the administrator of invalidation of the alternate authentication when the alternate authentication is made to be invalid.

10. The biometric authentication method as claimed in claim 9, wherein:

the alternate authentication is performed based on alternate information input by a user and another alternate information that is issued when the alternate authentication is made to be valid or that is registered in advance, in the performing of the alternate authentication; and the biometric authentication method includes performing, using the processor, an authentication based on at least one of the matching results of the performing of the matching and the switching validation and invalidation.

11. The biometric authentication method as claimed in claim 9, wherein the good and bad of the biometric condition is determined based on a success rate of matching performed in the performing of the biometric authentication, in the determining of the biometric condition.

12. The biometric authentication method as claimed in claim 9, wherein good and bad of the biometric condition is determined based on biometric information obtained plural times in the obtaining of the biometric condition, in the performing of the biometric condition.

13. The biometric authentication method as claimed in claim 10, further comprising demanding, using the processor, inputting of a predetermined indicated password from the user when the alternate authentication information is issued.

14. The biometric authentication method as claimed in claim 10, further comprising demanding, using the processor, issuing of the alternate authentication information from an administrator when the alternate authentication is made to be valid.

15. The biometric authentication method as claimed in claim 9, wherein the alternate matching is an authentication based on a matching result between second biometric information of the user registered in advance and another second biometric information input by the user.

16. The biometric authentication method as claimed in claim 9 wherein the alternate authentication is an authentication based on a matching result between IC card information of the user registered in advance and another IC card information input by the user.

17. A non-transitory storage medium that is readable by a computer and stores a program for causing a computer to execute a process comprising:

obtaining biometric information of a user;

determining good and bad of biometric condition of the user according to one or more biometric information of the user obtained in the obtaining of biometric information;

performing a matching between registered biometric information registered in advance and the one or more biometric information when the biometric condition is determined to be good in the determining of the biometric condition;

making an alternate authentication based on information that is different from the biometric information valid when the biometric condition is determined to be bad in the determining of the biometric condition; and informing, using the computer, an administrator of validation of the alternate authentication when the alternate authentication is made to be valid and informing, using the processor, the administrator of invalidation of the alternate authentication when the alternate authentication is made to be invalid.

18. The non-transitory storage medium claimed in claim 17 wherein:

the alternate authentication is performed based on alternate information input by a user and another alternate information that is issued when the alternate authentication is made to be valid or that is registered in advance, in the performing of the alternate authentication; and the process further comprises performing an authentication based on at least one of the matching results of the performing of the matching and the switching validation and invalidation.

\* \* \* \* \*